US011792215B1

(12) United States Patent
Atay

(10) Patent No.: US 11,792,215 B1
(45) Date of Patent: Oct. 17, 2023

(54) ANOMALY DETECTION SYSTEM FOR A DATA MONITORING SERVICE

(71) Applicant: Amazon Technologies, Inc., Seattle, WA (US)

(72) Inventor: Hasan Nuzhet Atay, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 557 days.

(21) Appl. No.: 16/209,792

(22) Filed: Dec. 4, 2018

(51) Int. Cl.
*H04L 51/224* (2022.01)
*H04L 67/55* (2022.01)
*G06F 3/04842* (2022.01)
*H04L 9/40* (2022.01)
*G06N 5/02* (2023.01)

(52) U.S. Cl.
CPC ........ *H04L 63/1425* (2013.01); *G06F 3/04842* (2013.01); *H04L 51/224* (2022.05); *H04L 67/55* (2022.05)

(58) Field of Classification Search
CPC .............. H04L 63/1425; G06F 3/04842; H04L 67/2804; H04L 43/0823
USPC .................... 709/223, 224; 726/1, 22, 23, 25
See application file for complete search history.

(56) References Cited

U.S. PATENT DOCUMENTS

| | | | | |
|---|---|---|---|---|
| 10,459,827 | B1* | 10/2019 | Aghdaie et al. | .... G06F 11/0751 |
| 2013/0024172 | A1* | 1/2013 | Suyama et al. | .... G05B 23/0254 703/2 |
| 2016/0065604 | A1* | 3/2016 | Chen et al. | ......... G06F 21/6227 726/23 |
| 2018/0039555 | A1* | 2/2018 | Salunke et al. | ...... G06F 11/3034 |
| 2018/0183823 | A1* | 6/2018 | Fadlil et al. | ............. G06N 3/08 |
| 2019/0228312 | A1* | 7/2019 | Andoni et al. | ......... G06F 17/18 |

OTHER PUBLICATIONS

"Article Chained Anomaly Detection Models for Federated Learning: An Intrusion Detection Case Study" - Preuveneers et al, Applied Sciences, Nov. 2018 https://www.mdpi.com/2076-3417/8/12/2663 (Year: 2018).*
"Native API Based Windows Anomaly Intrusion Detection Method Using SVM" - Wang et al, IEEE SUTC, Sep. 2006 https://ieeexplore.ieee.org/stamp/stamp.jsp?tp=&arnumber=1636219 (Year: 2006).*

* cited by examiner

*Primary Examiner* — Randy A Scott
(74) *Attorney, Agent, or Firm* — Nicholson De Vos Webster & Elliott LLP

(57) ABSTRACT

Techniques are described for an anomaly detection service for metric data collected by a data monitoring service of a service provider network. The anomaly detection service provides various graphical user interfaces (GUIs), public application programming interfaces (APIs), and other interfaces that enable users to specify metric data of interest to the user and for which the user desires the service to detect occurrences of anomalies. The selected metric data generally can correspond to any type of time series data collected by the data monitoring service and to which a user has access. Example types of metric data that can be monitored by an anomaly detection service include, but are not limited to, operational data generated by various components of a computer system, business data generated by various types of applications, and the like.

20 Claims, 11 Drawing Sheets

ANOMALY DETECTION SYSTEM FOR A DATA MONITORING SERVICE

BACKGROUND

The ability to collect and analyze large amounts of data has become an important aspect of decision making and planning in modern businesses and other settings. Common types of data collected for analysis include business metrics such as, for example, order rates, sales revenue, or website traffic, and computing infrastructure metrics such as, for example, CPU utilization, memory utilization, and the like. Users associated with such data often desire the ability to be alerted if and when the collected data exhibits anomalies, where an anomaly generally represents any portion of that data that significantly deviates from the majority of the data. For example, if a user is interested in monitoring a company's order rate for a certain product, the user might desire to be alerted if the order rate drops by more than 5% over some period of time, if such an event is rare. As another example, if time series data related to operation of one or more computing resources is collected, a system administrator might desire to be alerted if anomalous data points are detected, possibly indicating spikes in load, unusual bursts in network activity indicating potential security issues, evidencing hardware problems, and so forth.

Many types of applications and techniques are available to enable users to perform such anomaly detection for various types of data. However, these systems typically involve a significant amount of configuration by a user to enable accurate anomaly detection. For example, the underlying anomaly detection techniques and configuration processes can often be quite complex, making it such that only sophisticated users are able to set up such anomaly detection systems. Furthermore, the data being analyzed often changes in nature over time and maintaining the accuracy of an anomaly detection system as the data changes presents a number of challenges.

BRIEF DESCRIPTION OF DRAWINGS

Various embodiments in accordance with the present disclosure will be described with reference to the drawings, in which.

DETAILED DESCRIPTION

Figure 1:
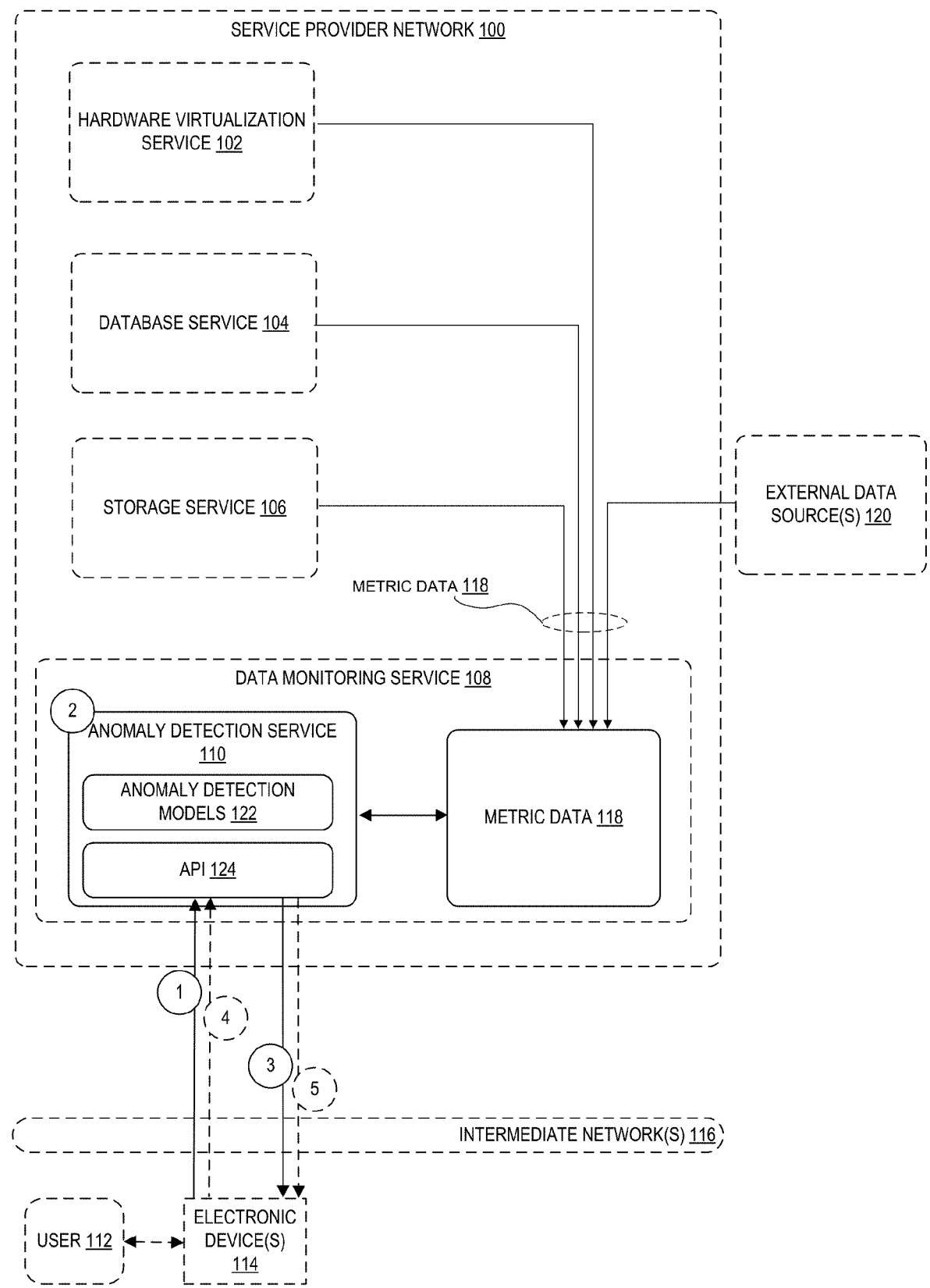
FIG. 1 is a diagram illustrating an environment including an anomaly detection service for metric data collected by a data monitoring service of a service provider network according to some embodiments.

Various embodiments of methods, apparatus, systems, and non-transitory computer-readable storage media are described for an anomaly detection service for metric data collected by a data monitoring service of a service provider network. According to some embodiments, the anomaly detection service provides various graphical user interfaces (GUIs), public application programming interfaces (APIs), and other interfaces that enable users to specify metric data of interest to the user and for which the user desires the service to detect occurrences of anomalies. The selected metric data generally can correspond to any type of time series data collected by the data monitoring service and to which a user has access. Example types of metric data that can be monitored by an anomaly detection service include, but are not limited to, operational data generated by various components of a computer system, business data generated by various types of applications, and the like.

The ability to collect and analyze large amounts of data has become an important aspect of decision making and planning in modern businesses and in other settings. Common types of data of interest include business metrics such as, for example, order rates, sales revenue, or website traffic, and operational metrics related to computer systems such as, for example, CPU utilization, memory utilization, and so forth. Users associated with such data often desire the ability to be alerted if and when portions of the collected data exhibit anomalies, where an anomaly generally represents any portion of that data that significantly deviates from the majority of the data. For example, if a user is interested in monitoring a company's order rate, the user might desire to be alerted if the order rate drops by more than 5% at any point in time, if such an event is rare. As another example, if time series data related to operation of one or more computing resources is collected, a system administrator might desire to be alerted if anomalous data points are detected, possibly indicating spikes in load, unusual bursts in network activity indicating potential security issues, evidencing hardware problems, and so forth.

Many different types of techniques and applications exist for detecting anomalies in such data. For example, various unsupervised, supervised, and semi-supervised anomaly detection techniques, or combinations thereof, can be used to construct anomaly detection models representing normal behavior from a given training data set. Examples of anomaly detection techniques used in various applications include density-based techniques (k-nearest neighbor, local outlier factor, isolation forests), replicator neural networks, Bayesian networks, Hidden Markov models, cluster analysis, and other ensemble techniques. Using these or other techniques, anomaly detection models can be generated based on historical data and used to determine whether anomalies exist in either the historical data or additional data obtained in the future.

Existing systems and applications used to monitor data for data anomalies typically allow users to configure static thresholds used to define boundaries for a "normal" region of the data, where data falling outside of the boundaries is considered to be anomalous. For many types of data, however, such static thresholds may be unsuitable because "normal" ranges associated with the underlying data can often change over time. For these and other reasons, existing anomaly detection systems typically require a significant amount of user involvement to accurately create and adapt anomaly detection models over time for each type of data being analyzed.

According to embodiments described herein, an anomaly detection service enables users to easily to initiate and configure anomaly detection for any type of metric data collected by a data monitoring service. Responsive to a user request to enable anomaly detection for a specified metric (for example, via a GUI or API request), the anomaly detection service can automatically create and configure one or more anomaly detection models for the specified data, configure alerts to be generated in response to detection of future anomalies based on the created models, and perform other actions that alleviate users from many of the challenges involved with configuring such anomaly systems. In some embodiments, the anomaly detection service further includes features that enable users to easily customize anomaly detection once enabled. For example, these features can include enabling users to customize high and low bands defining a normal region for their data, enable users to create additional bands relative to a model for the purposes of creating different types of alerts, enable users to provide domain knowledge about data sets to better configure anomaly detection models, enable users to view created models in various GUIs and to select particular models of greatest interest to a user, and so forth.

FIG. 1 is a block diagram illustrating an environment for providing an anomaly detection service as part of a data monitoring service. In some embodiments, a hardware virtualization service 102, database service 104, storage service 106, data monitoring service 108, anomaly detection service 110, and other possible services operate as part of a service provider network 100 and each comprises one or more software modules executed by one or more electronic devices at one or more data centers and geographic locations. A user 112 using one or more electronic device(s) 114 (which may be part of or separate from the service provider network 100) can interact with the various services of the service provider network 100 via one or more intermediate networks 116, such as the internet.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service 102 that can execute compute instances, a storage service 106 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 116 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, various components can be configured to emit metric data 118 to a data monitoring service 108 of the service provider network 100. A data monitoring service 108 generally can be used to collect monitoring data, operational data, and other data in the form of logs, metrics, and events, or any other type of data related to various types of computing resources of a service provider network 100. In some embodiments, a data monitoring service 108 can also collect data from external data sources 120, which can include data generated by any type of external computing resource or application. As indicated above, the metric data generally can include any type of operational data relating to various applications and systems, business data generated by various types of applications, and so forth. Although the metric data 118 is stored by a data monitoring service 108 in the example of FIG. 1, in general, the metric data can be stored at any location accessible to the anomaly detection service 110 or streamed from another location to the service.

In some embodiments, a data monitoring service 108 can be further used to set alarms, to visualize logs and metrics, to take automated actions, and further enable users to discover insights to optimize applications based on the collected metric data 118. As described hereinafter, in some embodiments, a data monitoring service 108 includes an anomaly detection service 110 that enables users to enable and configure anomaly detection for metric data collected by the data monitoring service. In an embodiment, users can configure computing resources to emit metric data that is collected and stored by the data monitoring service 108 in association with user accounts and, optionally, further in association with one or more namespaces that allows users to isolate data originating from particular data sources into separate data sets.

As indicated above, users often desire to know when particular sets of metric data 118 collected by the data monitoring service 108 exhibits anomalies. According to embodiments described herein, a user can use an anomaly detection service 110 of a data monitoring service 108 to create one or more anomaly detection models 122 that can be used to monitor metric data collected by the data monitoring service 108 and to which the user has access (for example, because the data is stored in association with the user's account in the data monitoring service or the user has otherwise been granted permission to access the data).

For example, in one embodiment, at the circle labeled "1" in FIG. 1, a user generates an application programming interface (API) request to enable anomaly detection for one or more specified metrics. For example, the API request can be defined by an API 124 provided by the anomaly detection service 110 and which defines various request methods that can be used to create and configure anomaly detection models and alarms associated with such anomaly detection models. In an embodiment, an enable anomaly detection API request includes an identifier of at least metric for which the user desires anomaly detection and, optionally, an identifier of at least one algorithm name to be used to create an anomaly detection model used to perform the requested anomaly detection. For example, if the user has configured the data monitoring service 108 to collect metric data related to CPU utilization of a fleet of compute instances managed by the user, the user can specify the CPU utilization metric and/or any other metric of interest in the API request.

In an embodiment, an API 124 can include methods such, as for example, an enable anomaly detection method, a disable anomaly detection method, a list anomaly detection models method, an enable alarm method, and a disable alarm method.

An enable alarm method, for example, can include parameters such as a metric identifier, one or more algorithm names, one or more parameters, and optionally a parameter to update an existing model instead of enabling a new model. The anomaly detection service 110 can response with a message indicating that the request succeeded or failed. In an embodiment, a disable anomaly detection method can include parameters such as, for example, a model identifier (to disable a single model) or a metric identifier (to disable all models on that metric), and the anomaly detection service 110 can respond with a success or failure message.

In an embodiment, a list anomaly detection models method can include parameters such as, for example, a metric identifier (to list models on a single metric), a user identifier (to list all models enabled by a user), an account identifier (to list all models associated with an account), and optional parameters to indicate the fields in response, and the anomaly detection service 110 can respond with a list of model identifiers and information about the requested fields.

In an embodiment, an enable alarm method can include parameters such as, for example, a metric identifier and, optionally, one or more algorithm names, model parameters, and a model identifier (to update an existing alarm instead of enabling a new alarm), and the anomaly detection service 110 can respond with a message indicating success or failure creating the alarm. In an embodiment, a disable alarm method can include parameters such as, for example, an alarm identifier (to disable a single alarm) or a metric identifier (to disable all alarms on that metric), and the anomaly detection service can respond with a message indicating success or failure disabling the alarm. Example operations performed by an anomaly detection service 110 in response to receiving these and other API requests are described below.

In an embodiment, at circle "2," the anomaly detection service creates one or more anomaly detection models for the one or more metrics specified in the received API request. In one embodiment, the creation of the one or more anomaly detection models can include obtaining historical data for the specified metric, using the obtained historical data to create the one or more anomaly detection models, and storing model output in a data store accessible to the user. As described elsewhere herein, the creation of the anomaly detection models can occur automatically in response to the user's request and, in some examples, can be further modified based on additional input received from a user to further configure the models in various ways.

As indicated above, the request to enable anomaly detection can be specified by a user with minimal additional input from the user. For example, a definition of what types of data are "normal" or "anomalous" may not be important or understood some types of users. In these instances, for example, the anomaly detection service 110 can simply receive a request to enable anomaly detection on a metric and automatically create the anomaly detection models used to perform the requested anomaly detection without further user involvement.

In other examples where users might desire more customization, the anomaly detection service 110 can, for example, display various representations of the created models and further display an indication of how often an alarm is expected to be triggered for a particular metric with the current model configuration settings. For example, by analyzing historical data associated with the metrics specified in the request, the anomaly detection service 110 can display to the user an indication that the alarm is expected to be triggered approximately five times a week with a high sensitivity setting, approximately three times a week with a middle sensitivity setting, or approximately once a week with the low sensitivity setting. The anomaly detection service 110 can further display an indication of instances of anomalies in historical data used to generate the model(s). As described elsewhere herein, users can optionally use these and other types information to further configure the automatically created anomaly detection models, as desired.

Figure 2:
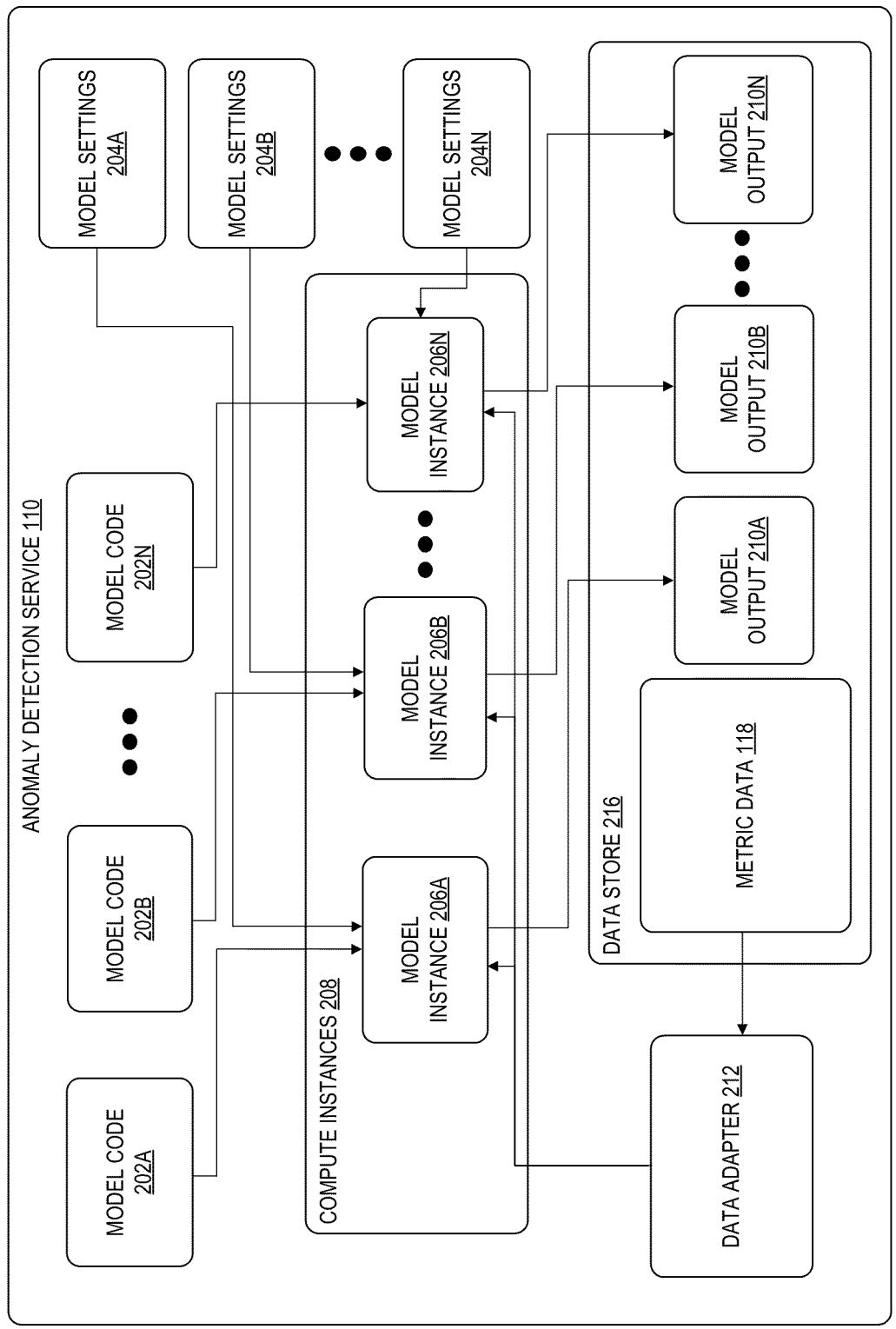
FIG. 2 is a diagram illustrating components of an anomaly detection service according to some embodiments.

FIG. 2 is a diagram illustrating example components of an anomaly detection service. As shown in FIG. 2, in one embodiment, an anomaly detection service 110 includes model code 202A-202N, model settings 204A-204N, model instances 206A-206N, metric data 118, and resulting model outputs 210A-210N.

In an embodiment, each instance of model code 202A-202N represents code that can be used to implement a particular type of anomaly detection algorithm or technique. Example types of anomaly detection algorithms include, but are not limited to, density-based techniques (k-nearest neighbor, local outlier factor, isolation forests), replicator neural networks, exponential smoothing, Bayesian Networks, Hidden Markov models (HMM), random cut forests, ensemble techniques, and so forth. In an embodiment, the set of algorithms can change over time as new algorithms are added or older algorithms are removed, and the code implementing each of the algorithms can be updated. In an embodiment, each of model settings 204A-204N represents distinct settings and configurations that can be used by a model code to create model output. Similar to the model code, the set of model settings 204A-204N can change over time as settings are added, removed, or modified.

In an embodiment, a combination of a model code and associated model settings can be executed as a model instance, as illustrated by the model instances 206A-206N. In an embodiment, each of the model instances can be executed using one or more compute instances 208 (for example, VMs, containers, or other compute resources) which, for example, may be managed by a hardware virtualization service 102 or other part of the service provider network 100. As shown in FIG. 2, the execution of a model instance further includes obtaining metric data 118 as input, which can be obtained and provided to the model instance via a data adapter 212. For example, the data adapter 212 can obtain metric data corresponding to one or more metrics specified by a user for anomaly detection and provide the data to the appropriate model instance(s). In an embodiment, the execution of a model instance results in the creation of a model output (for example, one of model outputs 210A-210N), which can be stored using a data store 216 and can be associated with a model instance identifier so that the output can be referenced by other parts of the service (for example, to display particular model outputs in one or more GUIs).

In an embodiment, the anomaly detection service 110 can generate one or more GUI interfaces that display the model outputs generated in response to a user request in parallel (for example, by viewing graphs representing the model outputs in a GUI generated by the anomaly detection service), and the user optionally can select one or more model outputs that appear to best fit the user's data related to the specified metric. In an embodiment, the user can then provide additional input requesting the creation of alarms using the selected models (for example, the user might provide input requesting the creation of an alarm based on the model output L, which is based on model code M and model settings N). In this example, the associated model instance and model settings can be configured to continue executing on additional data received for the specified metric and can generate notifications when anomalies are detected. In other embodiments, users can select two or more models and the selected models can continue to execute in parallel. In this example, notifications can be generated when either model detects an anomaly, based on an average of the models, or based on any other composite value derived from the models collectively.

In an embodiment, the anomaly detection service 110 can automatically select one or more types of model code and model settings to use for a metric specified in a user request to initiate anomaly detection. For example, the anomaly detection service 110 can compare data associated with a specified metric to existing metrics associated with model code and settings known to perform well for the particular type of data (for example, using various classification techniques to find data similar to data associated with a specified metric).

As indicated above, the anomaly detection service 110 can use multiple model code and model setting combinations to create various anomaly detection models for a specified metric. In one embodiment, various types of cross validation techniques can be used to automatically determine one or more of the created models that appear to best fit the data. The anomaly detection service 110 can then present the selected models to a user for confirmation.

In an embodiment, once one or more models have been selected for a specified metric (for example, either automatically or based on user selection), the anomaly detection service 110 continues to execute the selected models based on additional data received for the specified metric. The continued execution of the selected models can include generation of various types of notifications and actions in response to the selected models identifying anomalies in the additional data. In an embodiment, the process for creating the set of one more anomaly detection models can also be reiterated on a periodic interval (for example, weekly or monthly) based on the now additional historical data associated with the metric, and possibly using the different sets of algorithms and parameters, to update or create new models. For example, the anomaly detection service 110 may add new model code and model settings over time and newly added model code and setting combinations may be determined to provide a more accurate model. This process of continuously updating the set of models used can be performed with little or no additional user input, depending on a user's desire to be involved in the process.

In some embodiments, in addition to specifying a metric to initiate anomaly detection, users can optionally specify one or more particular algorithms and model settings desired to be used. In this example, the anomaly detection service 110 can generate models in a manner similar to that described above but can ensure that the set of models includes the model code and setting combination(s) specified by the user in the request. In this example, a user can be notified when the models specified by the user identify anomalies while one or more other models run without generating notifications. If the anomaly detection service 110 determines that one or more of the other models may provide more accurate results, the service can provide suggestions to the user related to using the other models.

As indicated herein, anomaly detection algorithms generally rely on historical metric data for creating anomaly detection models and using the created models to detect anomalies. However, there may be instances where occurrences of particular anomalies in a user's data actually represent variations expected by the user. For example, if a metric is used to predict a total number of healthy servers managed by a system administrator, and if the system administrator suddenly doubles the number of servers with a large purchase of additional servers, an associated anomaly detection model may identify such a change as an anomaly. In instances similar to the above, the anomaly detection service 110 enables users to provide input (for example, via one or more GUIs) identifying occurrences of changes to metric data for which the user desires not to trigger an anomaly (for example, by viewing a graph representing a model and unselecting one or more data points identified as an anomaly). In an embodiment, the anomaly detection service 110 can use the user-provided input to adjust any corresponding anomaly detection models accordingly to avoid the generation of undesirable notifications for similar events in the future.

In an embodiment, data models associated with various users can be stored in association with user-specific permissions, for example, as managed by an identity and access management service. In this manner, models created by different users can be stored using a same set of storage resources but in which access policies control which users can access certain model data. In an embodiment, model results (for example, including time series generated by the anomaly detection service 110) are also stored in data stores. When users are interacting with the service using a console or API, credentials used for accessing the metric data can be used for storing the anomaly detection model results to a data store. In some cases, it is desirable for some users to have access to metric data but not model results (for example, if multiple teams use different anomaly detection algorithms on a same metric but do not want to share the results among each other) and thus user policies can be implemented to limit access to metric data and model data separately for defined individual users or user groups.

As indicated above, an anomaly detection service 110 is able to update and add new algorithms (for example, implemented by model code) over time and to update various settings associated with existing models. To avoid the introduction of false alarms or missed alarms based on model updates, in one embodiment, the anomaly detection service 110 implements a "backtesting" environment where existing model results can be compared to results of candidate models. Examples of comparisons that can be made include accuracy of the anomaly detection results with respect to the actual values in error metric mean squared error, volatility of the anomaly detection results, a maximum difference between the expected value and actual value, number of expected alarms, and so forth. In one embodiment, testing new models can include obtaining historical data over a past time range (for example, the past four weeks) and dividing the data into equal groups. In both the current production environment and candidate environment, most of the data can be used to train the model and a portion of the data can be used to create model results for comparison.

In an embodiment, the training of a model results in parameters that define the model. As additional data is provided to a trained model and as the data changes, the parameters associated with the model may also change. In general, a mature and stable model is associated with relatively stable parameters. For example, if a model's parameters change frequently, this may indicate that the model is not suitable for this type of data, that not enough training data is available to capture what the data truly represents (for example, either because the data has features that keeps changing in time or the period of the training data is too short), or that the model has too many parameters to define the data and, as a result, training generates over fitted model that gives bad results at out-of-sample testing.

In some embodiments, an anomaly detection service 110 can identify issues such as those above using k-fold cross-validation. For example, the data for each metric can be separated into k groups, using k-1 parts to train a model and use the remaining part to test and obtain confidence intervals. This process can be repeated any number of times and the data can be separated in different ways. Furthermore, the separate groups of training data can be organized randomly each time to test robustness. In this example, if the model parameters continue to change, the user can be alerted to investigate the reason for the change based on the testing described above.

In one embodiment, once an anomaly detection model is trained based on historical data, the model can be used to predict the future values. The model can be further updated in a variety of ways as the new data is obtained. As one example, a model can be reconfigured for each new data point obtained. While this approach can cause the model to be more reactive, this approach is not always suitable because noise in data or incorrect inputs can skew the model parameters and lead to incorrect results. As another example, the parameters associated with a trained model can be static. If an anomaly detection model obtains sufficient training data to accurately capture the behavior of the associated system, this approach can sometimes provide optimal results but can cause issues if the data significant changes in nature over time. One compromise is to train the model as the new data arrive but update the parameters only if significant enough changes are observed.

In one embodiment, a triple exponential smoothing model can be used to generate three parameters during training: alpha, beta, and gamma, and one estimate about the seasonality in the data. As a result of training and seasonality assumption, initial values for these parameters are obtained. If k-fold validation during training generates significantly random values (for example, 0.9 for alpha in one test and 0.1 in another), the accuracy of results in forecasts can be affected. In this example, the identified model deficiency can be presented to the user and the user can optionally select a different model or model parameters.

Assuming that the k-fold cross validation process generates stable parameters, the variation in parameters can be used to determine how to update these parameters as new data is obtained. For example, after an initial training with three days of data, assume the following variance values of the parameters:

|       | Value | Variance |
|-------|-------|----------|
| Alpha | 0.6   | 4%       |
| Beta  | 0.01  | 10%      |
| Gamma | 0.9   | 20%      |

After additional training based on an additional day of data, if new parameters are within the variance bands, the anomaly detection service 110 can elect to not update the parameters. One the other hand, if the parameters have changed more than expected, an automated method can be used to update the parameters. For example, the anomaly detection service 110 can first check whether there are any errors in the input data, or whether some fundamental change in the nature of data occurred (such as, for example, the amount of data suddenly measures in terabytes instead of gigabytes). In an embodiment, identified incorrect inputs can be filtered out, or other techniques can be used to account for the variance.

In an embodiment, each time the anomaly detection service 110 updates a model, the service can ensure that the changes do not increase a number of alarms more than a reasonable amount (for example, by analyzing data to see if the model identifies significantly more anomalous data points than a previous version of the model). In an embodiment, the anomaly detection service 110 can enable users to revert models to a previous version, if desired.

In an embodiment, at circle "3," the anomaly detection service presents information about created anomaly detection models to the user. In one embodiment, the created models can be viewed as graphs in one or more GUIs or other interfaces of the anomaly detection service. In other embodiments, data about the created models can be obtained in other formats using an API 124 or other interface. Other types of interfaces that can be used to display information about created models are described elsewhere herein.

Figure 3:
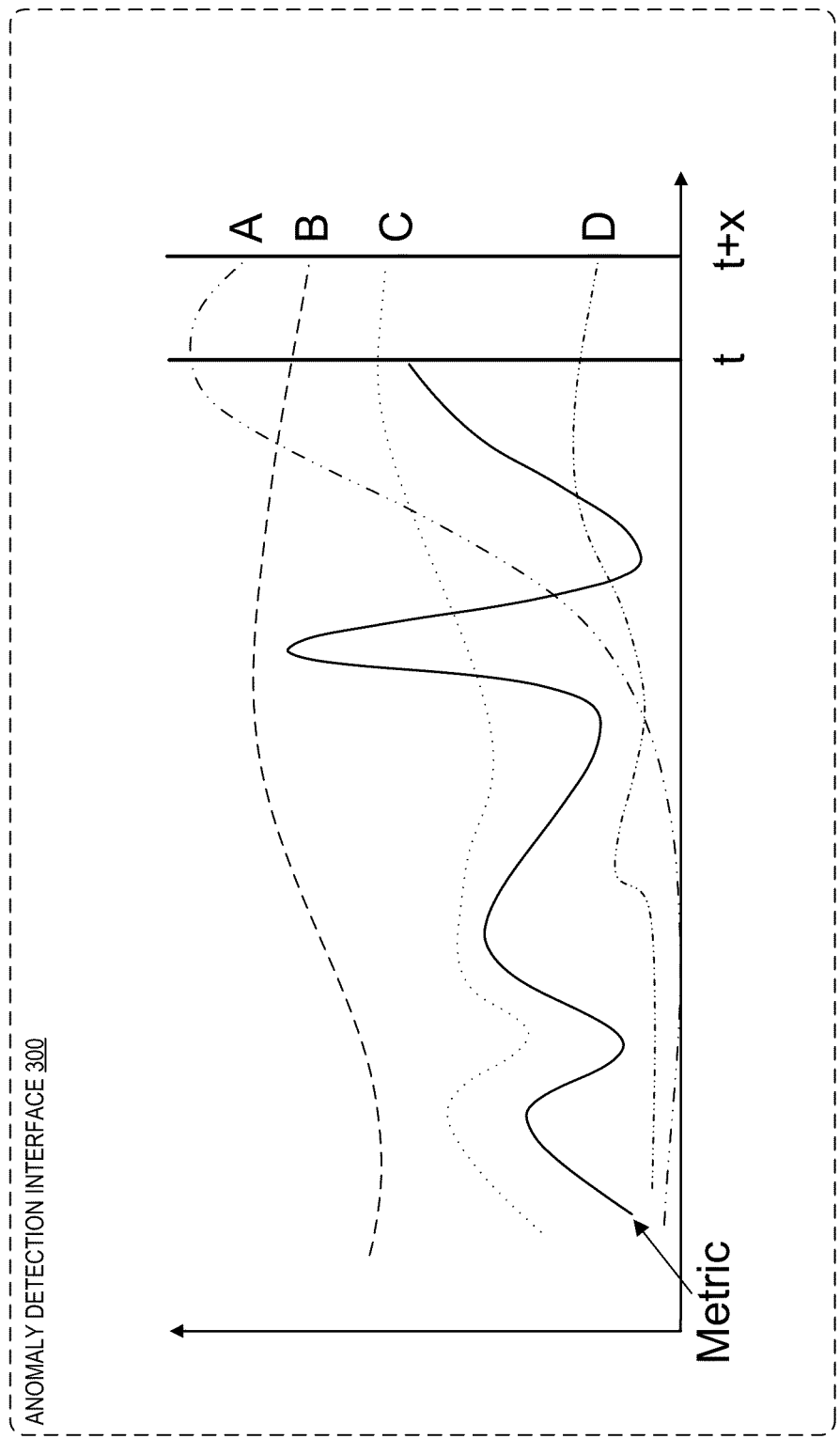
FIG. 3 illustrates an example interface provided by an anomaly detection service showing a graph representing an anomaly detection model according to some embodiments.

In an embodiment, users can use a GUI generated by the anomaly detection service 110 to experiment with models created using various different algorithms and settings, for example, to observe what data points one or more particular anomaly detection algorithms would have identified as anomalous in historical data. FIG. 3, for example, illustrates a graph that can be displayed in an anomaly detection interface 300 generated by a data monitoring service 108 or anomaly detection service 110. As shown in FIG. 3, assuming that the current time is t, settings that resulted in the forecasts A and B can be used to detect instances where two different algorithms create such different results that the forecasts cross each other and move in opposite directions, which can indicate an occurrence of an anomaly. Model settings that created the forecast C can be used to detect the peak as an anomaly, while the settings that created the forecast D can be used to detect the low point of the metric as anomaly. Using the interface 300, for example, users can see various models and select one or more that may be best suited for their use case.

In an embodiment, at circle "4" in FIG. 1, for example, a user optionally can provide input to configure various aspects of the anomaly detection models created for the user. In general, users can have varying definitions of "normal" as it relates to detecting anomalies depending on the characteristic of the data associated with a user. Furthermore, these differences are not always data dependent, so algorithmic methods purely based on historical data are sometimes insufficient to identify such differences. As a result, users may sometimes believe that an automatically generated "normal" region around a metric is either too narrow or too wide. To enable users to customize a normal band around a generated anomaly detection model, an anomaly detection service 110 enables users to change the width of the band surrounding a generated model, thereby changing when the user may be notified of detected anomalies.

Figure 4:
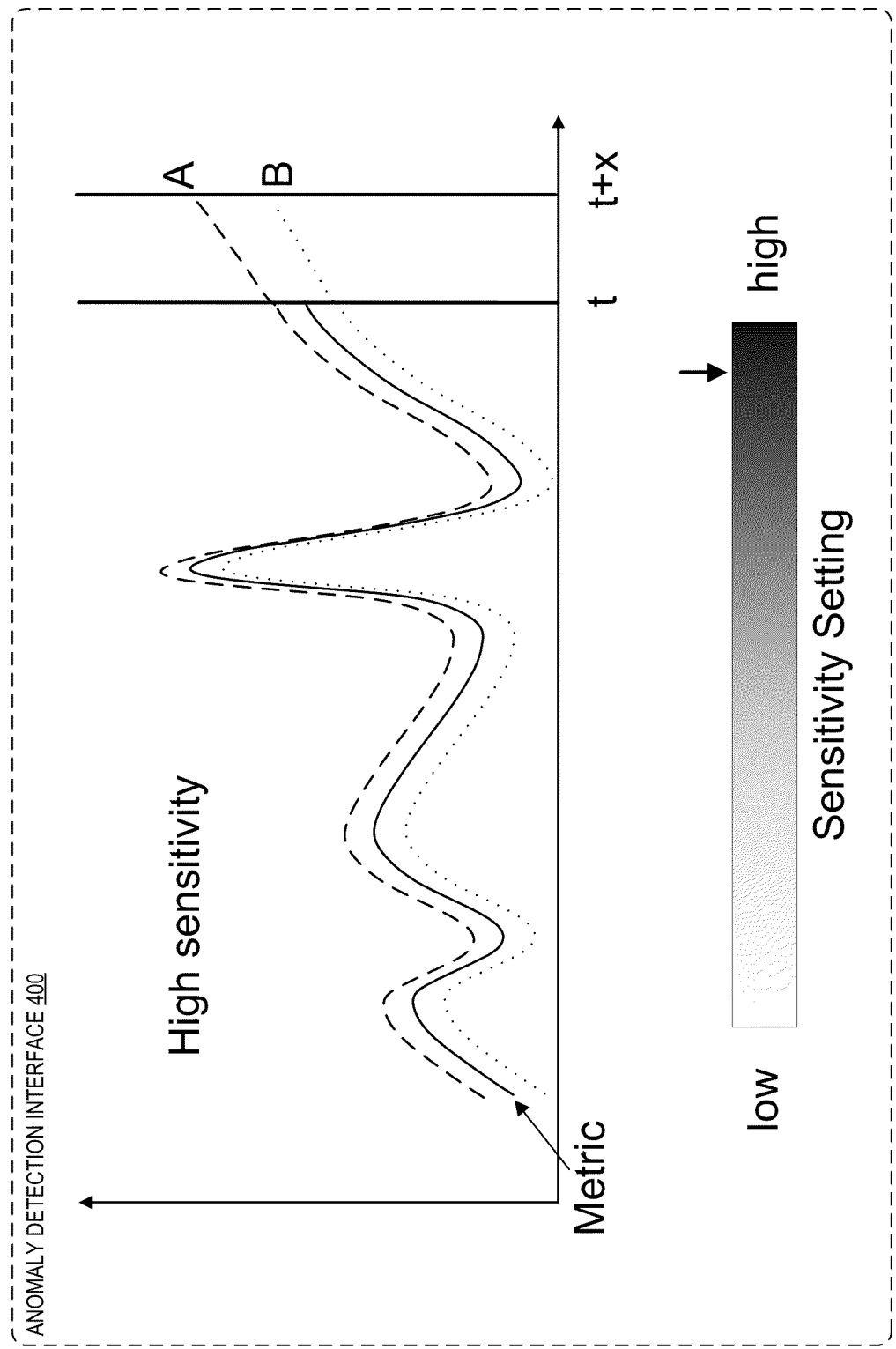
FIG. 4 illustrates an example interface provided by an anomaly detection service showing a graph representing an anomaly detection model and further enabling a user to adjust an alarm region around the model according to some embodiments.
Figure 5:
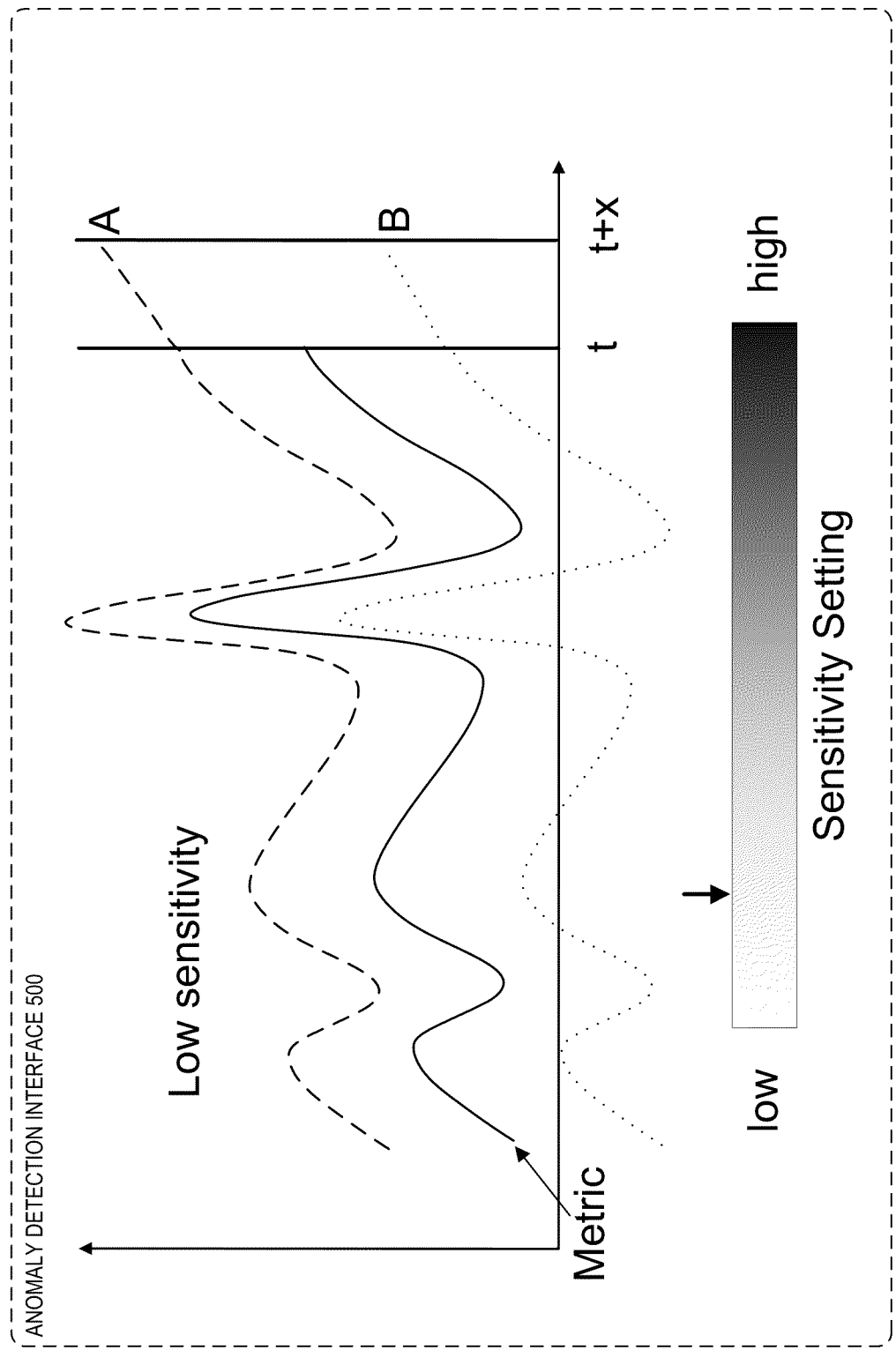
FIG. 5 illustrates an example interface provided by an anomaly detection service showing a graph representing an anomaly detection model and further illustrating a user adjustment to an alarm region around the model according to some embodiments.

FIG. 4 illustrates a graph that can displayed in an interface 400 that enables a user to configure a confidence interval around a model to define a "normal" region. As shown, users can use an interface element (for example, a sensitivity slider) to adjust a size of the "normal" region around the metric illustrated by the dashed lines on either side of the metric line. FIG. 5, for example, illustrates a graph displayed in an interface 500 similar to that shown in FIG. 4 where a user has provided input adjusting the sensitivity setting so that the normal region around the metric is wider, thereby causing an alarm associated with the model to be less sensitive.

Figure 6:
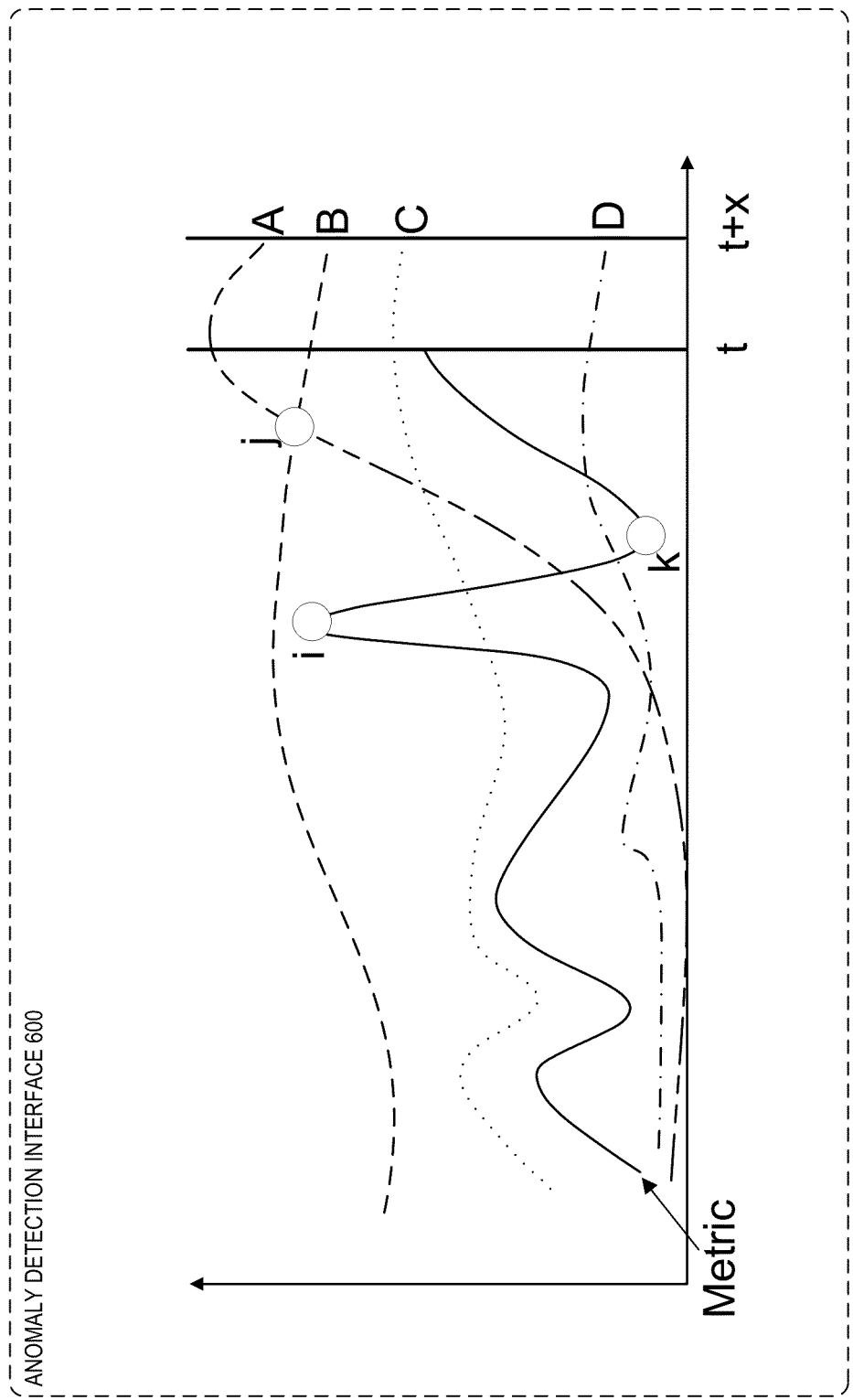
FIG. 6 illustrates an example interface provided by an anomaly detection service showing a graph representing an anomaly detection model and further depicting identified anomalous data points according to some embodiments.

In an embodiment, an anomaly detection service 110 can further provide access to GUIs that further enable users to customize and understand the configuration of anomaly alarms associated with various models. As indicated above, an alarm associated with a model can be triggered when anomalous data is detected. For example, FIG. 6 illustrates an anomaly detection interface 600 showing a graph that illustrates data points in historical data that would have triggered the generation of an alarm notification based on the current model settings. As shown in FIG. 6, a user can view the graph to see that data points at points i, j, and k represent anomalies and would have resulted in an anomaly notification based on the current settings. If the user determines that the displayed data points appear to represent anomalies as the user intends, the user can provide input confirming use of the represented model for anomaly detection and related alarms or the user can otherwise provide input adjusting a normal band surrounding the model, as desired.

Figure 7:
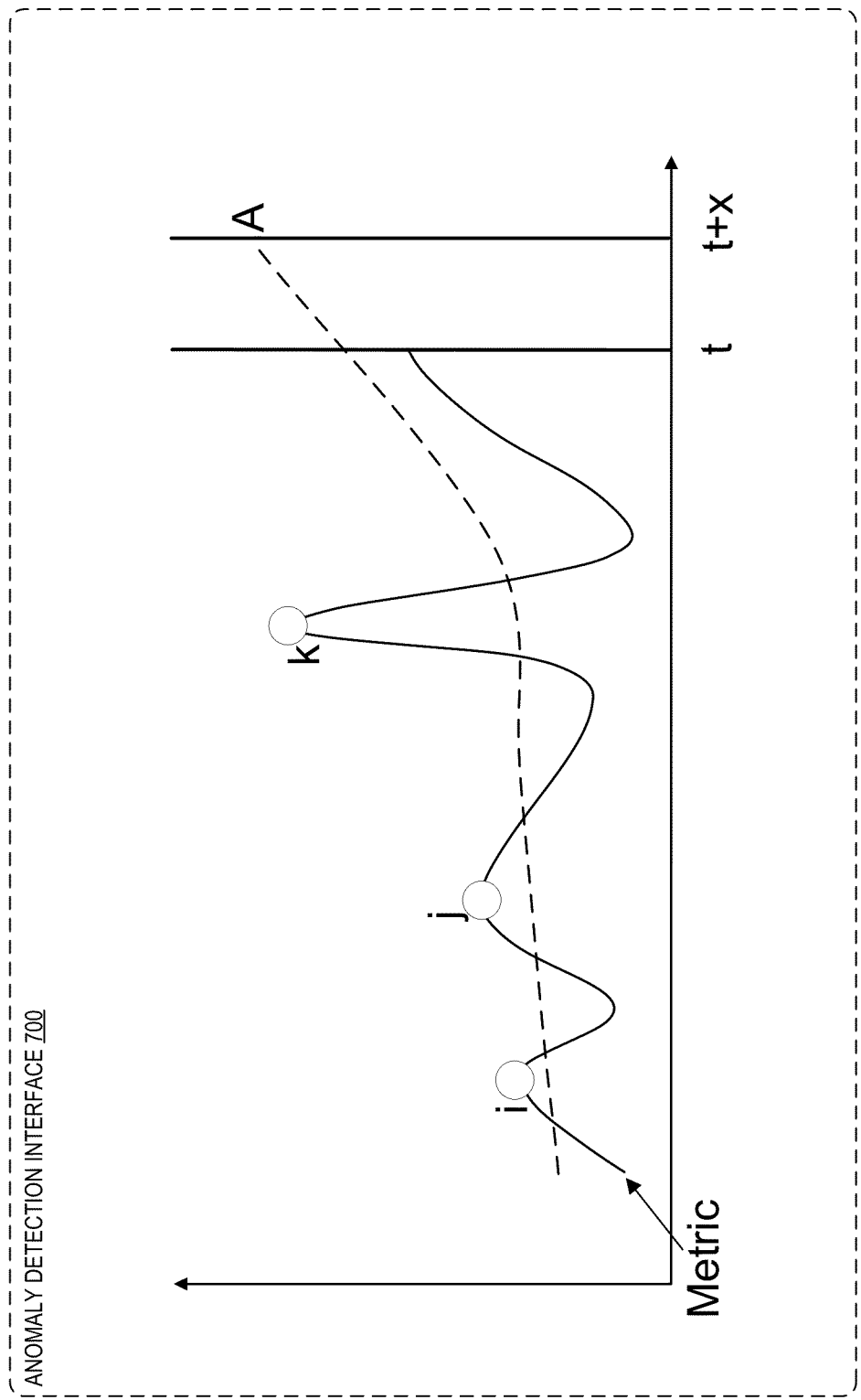
FIG. 7 illustrates an example interface provided by an anomaly detection service showing a graph representing an anomaly detection model and further depicting user specification of data points identified as anomalous according to some embodiments.

FIG. 7 illustrates an interface 700 including a graph that can be used to select points on a metric that a user identifies as being anomalous. In an embodiment, based on the selected data points, the anomaly detection service 110 can identify an anomaly detection model that fits the user's selections and visually display the model results to the user. For example, as shown in the graph displayed in the anomaly detection interface 700, a user has selected points i, j and k as points that the user believes represent anomalies.

Based on the selected point(s), the anomaly detection service 110 can generate a model that is represented by the line A that can be used to identify anomalies similar to those selected by the user. The user can further edit these settings if desired and can assign an alarm to the model when the user is comfortable with the results.

As indicated above, an anomaly detection model created by an anomaly detection service 110 can provide a user with three time series: an expected value, a high band, and a low band. In an embodiment, users can request the generation of other bands. In this example, users can configure alarms with varying levels of severity and assign those alarms to a particular band depending on the width. For example, a user might associate a low severity alarm with a narrowest band, and middle severity alarm with a wider band, and a high severity alarm with a widest band. In various embodiments, users can use an API, metric math, or GUIs to create the bands.

In one embodiment, can associate an alarm with two or more different algorithms having different characteristics and expected values, and the alarm can be triggered if a difference between the algorithms exceeds some threshold. For example, one algorithm might work well with trending metric values, while another algorithm with seasonal metric values. In this example, if the trending algorithm starts deviating from the seasonal algorithm beyond a defined threshold, this deviation might indicate an unexpected growth or decline. In other examples, users can configure a same algorithm with different training periods, different forecast horizons, different outlier remover settings, and so forth, and configure alarms to be triggered when a significant divergence in the different algorithms is detected. Users can configure such alarms using the API, metric math, or GUI.

Metric data 118 collected by a data monitoring service 108 typically is associated with timestamps based on either Coordinated Universal Time (UTC) or based on a specified time, which can be converted into UTC by the data monitoring service 108. The consistency of the UTC format can be helpful for many processing tasks, however, for some metrics, daylight-saving updates in local time can affect associated data patterns. For example, if metric data representing an order rate in a particular time zone typically peaks at 3pm UTC each day, when that time zone enters daylight savings and adjusts its clocks one hour ahead, the peak instead occurs at 2pm UTC since shoppers are likely to continue following local time patterns. However, not all metrics follow the changes in daylight-saving schedules. For example, if a metric measures an amount of sunlight received by solar panels, daylight saving changes in a given day would not influence the timing of these metrics based on UTC time. A similar expectation typically holds true for most computational performance metrics, where processor utilization rates, job execution times, capacity and availability of resources, and so forth, are usually not affected by daylight saving changes. An anomaly detection service 110 can detect if a metric is influenced by daylight saving changes based on the metrics history over past years, but this approach can be costly since it requires storing, retrieving, and analyzing data over a long timeframe.

In an embodiment, user input can be received to enable anomaly detection models to account for daylight saving-dependent metrics. For example, the anomaly detection service 110 can be configured to indicate to a user that a selected metric exhibits seasonality pattern less than daily. For example, the service can detect if a metric typically peaks at certain time of the day and present this information to a user with an indication that an associated anomaly detection model may deteriorate in response to daylight savings changes. A user can then optionally provide information indicating one or more time zones associated with the metric data and further provide an indication of whether the user expects the data to be dependent on daylight savings changes. This information can then be used to adjust the associated model(s) to account for such daylight savings changes.

In an embodiment, an anomaly detection service 110 enables users to update anomaly detection models using metric math, which can be used as a flexible and intuitive way to enable users to update models. For example, users can enable and experiment with anomaly detection models using metric math, where algorithms are in-built functions with input parameters for customization (for example, anomaly _detection _algo_l(x, a), where a can be the width of the "normal" band). This allows using outputs of anomaly detection algorithms to be consumed using metric math (for example, anomaly _detection _1(x,a)+b*y) and for outputs of anomaly detection algorithms to serve as inputs to other anomaly detection algorithms (for example, anomaly _detection_algo_2(anomaly_detection_1(x,a))+b*y).

To better enable users to experiment with and modify models in real time, the anomaly detection service 110 can cache the data used for training and start preliminary calculations when a user provides input to modify a model. In an embodiment, model updates or results generated based on the user input can be stored in a cache and presented visually in a GUI but not yet stored in a data store. In this example, when a user exits the experimentation GUI or console, the cache is cleaned and only the history of the session is stored. For the models that a user desires to enable and have the results stored, the user can provide input requesting to save the model and configure alarms as desired.

In an embodiment, users can search for defined models for the metrics associated with a user. For example, the ability to save and search for created models enable users to iterate on previous work, among other benefits. In an embodiment, users can request to see all the models that are currently associated with a specified metric and the anomaly detection service 110 can return any model identifiers, algorithm names, and additional parameters or other information depending a user request(for example, list_anomaly_detection_models() to see all models or list_anomaly _detection_models ("number of confidence intervals") to see a number of confidence intervals associated with each model).

In an embodiment, at circle "5," the anomaly detection service optionally generates one or more notifications based on identification of an anomaly for a user-specified metric. In an embodiment, a notification generated by an anomaly detection service 110 in response to detection of an anomaly generally can be any defined action, such as causing display of a notification in a dashboard or other GUI element, a notification sent as an email or as a notification to a notification service, one or more actions to be performed by another service of a service provider network 100, and so forth.

In some embodiments, some or all of the components of an anomaly detection service 110 can be implemented using any number of separate services of a service provider network 100. For example, various features of the anomaly detection service 110 can be implemented using compute instances provided by a hardware virtualization service 102, provide an API using an API gateway service, store models and other data using various storage services, and so forth.

Figure 8:
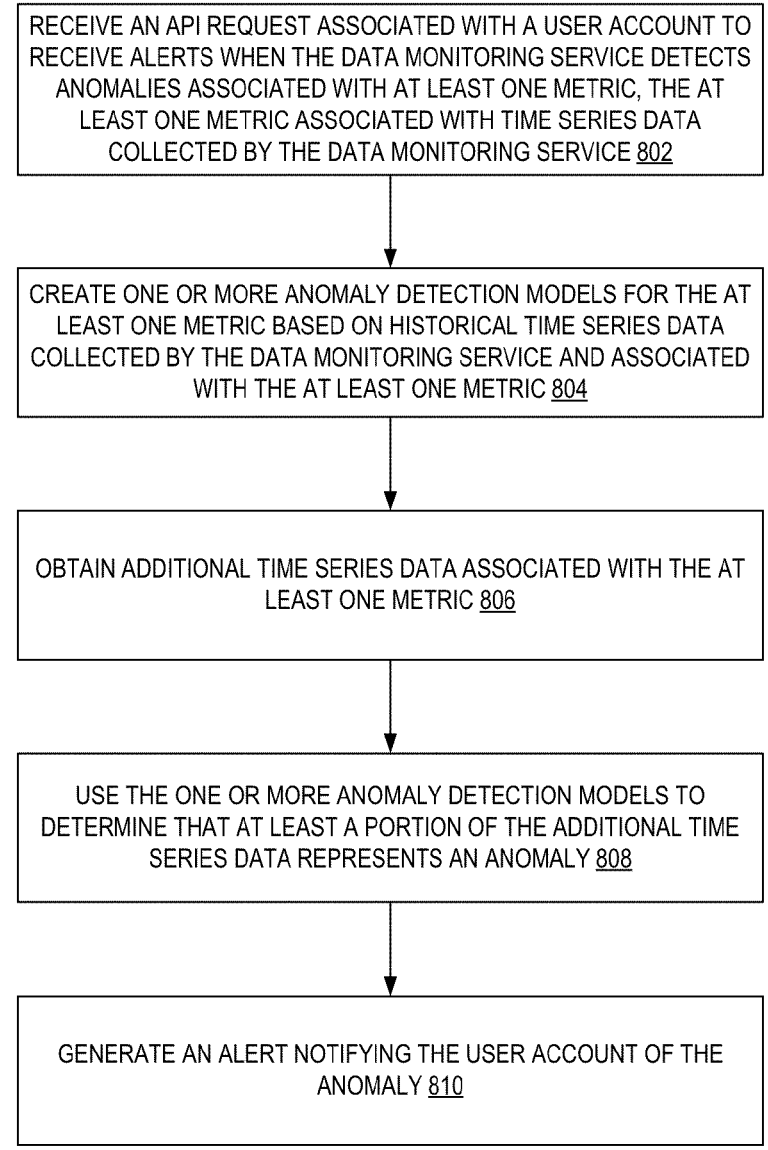
FIG. 8 is a flow diagram illustrating operations of a method for enabling users to request anomaly detection for metric data collected by a data monitoring service according to some embodiments.

FIG. 8 is a flow diagram illustrating operations 800 of a method for providing an anomaly detection service for metric data collected by a data monitoring service according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by an anomaly detection service 110 of the other figures.

The operations 800 include, at block 802, receiving an API request associated with a user account to receive alerts when the data monitoring service detects anomalies associated with at least one metric, the at least one metric associated with time series data collected by the data monitoring service. For example, as illustrated in FIG. 1, an anomaly detection service 110 can receive an API request via an API 124 to configure anomaly detection for one or more metrics associated with metric data 118.

The operations 800 further include, at block 804, creating one or more anomaly detection models for the at least one metric based on historical time series data collected by the data monitoring service and associated with the at least one metric. For example, as illustrated in FIG. 2, the anomaly detection service 110 can create one or more anomaly detection models based on one or more model codes and model settings based on historical time series data associated with the specified at least one metric.

The operations 800 further include, at block 806, obtaining additional time series data associated with the at least one metric. For example, the anomaly detection service 110 can receive additional metric data 118 that is obtained subsequent to the generation of the one or more anomaly detection models.

The operations 800 further include, at block 808, using the one or more anomaly detection models to determine that at least a portion of the additional time series data represents an anomaly. For example, an anomaly detection service 110 can use the one or more anomaly detection models can determine whether a portion of the additional time series data represents an anomaly by determining whether data falls outside of a defined "normal" region around the model, or using any other criteria associated with the model or combination of models.

The operations 800 further include, at block 810, generating an alert notifying the user account of the anomaly. In an embodiment, generating the alert can include causing a notification displayed in a GUI or console, sending an email or other type of message alert, publishing a notification message to an event notification service, causing one or more actions to occur at other services of a service provider network, or any other action indicating the occurrence of the anomaly.

In an embodiment, the operations further include causing display of a GUI including a graphical representation of at least one anomaly detection model of the one or more anomaly detection models, receiving input via the GUI specifying a normal region surrounding the graphical representation, and modifying settings associated with the at least one anomaly detection model for identifying anomalies based on the input specifying the normal region.

In an embodiment, the operations further include creating a plurality of anomaly detection models based on a plurality of separate anomaly detection algorithms and a plurality of separate model settings, causing display of a graphical user interface (GUI) including graphical representations of the plurality of anomaly detection models, receiving input identifying one or more selected anomaly detection models of the plurality of anomaly detection models to use for anomaly detection, and using the one or more selected anomaly detection models to determine that at least a portion of the additional time series data represents an anomaly.

In one embodiment, the one or more anomaly detection models are stored in a data store in association with the user account.

In an embodiment, the operations further include periodically updating the one or more anomaly detection models based on the additional time series data.

In an embodiment, the operations further include creating a new anomaly detection model for the at least one metric based on new model code or new model settings, and using the new anomaly detection model to determine that at least a portion of the additional time series data represents an anomaly.

In an embodiment, the operations further include receiving input indicating that the at least a portion of the additional time series data does not represent an anomaly, and updating the one or more anomaly detection models based on the input indicating that the at least a portion of the additional time series data does not represent an anomaly.

In an embodiment, the operations further include receiving input identifying one or more data points of the historical time series data as anomalous data points, and creating the one or more anomaly detection models based in part of the input identifying the one or more data points of the historical time series data as anomalous data points.

In an embodiment, the historical time series data and the additional time series data associated with the at least one metric are generated by one or more computing resources of a service provider network.

In an embodiment, each anomaly detection model of the one or more anomaly detection models is created based on a pairing of a model algorithm of a plurality of model algorithms and model settings of a plurality of model settings.

In an embodiment, generating the alert includes one or more of: causing display of a notification in a graphical user interface (GUI), sending an email alert, and publishing a notification message to an event notification service.

Figure 9:
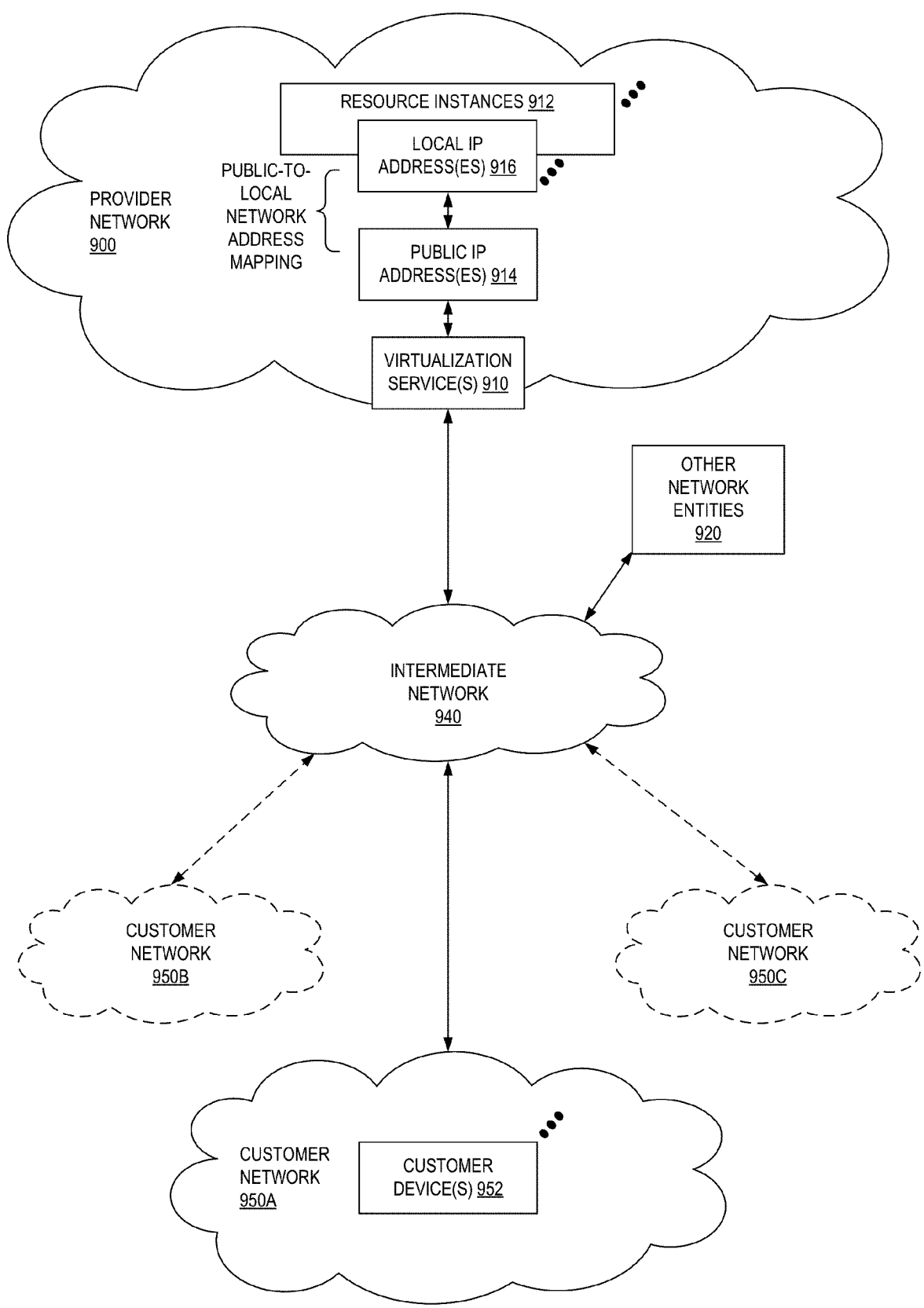
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
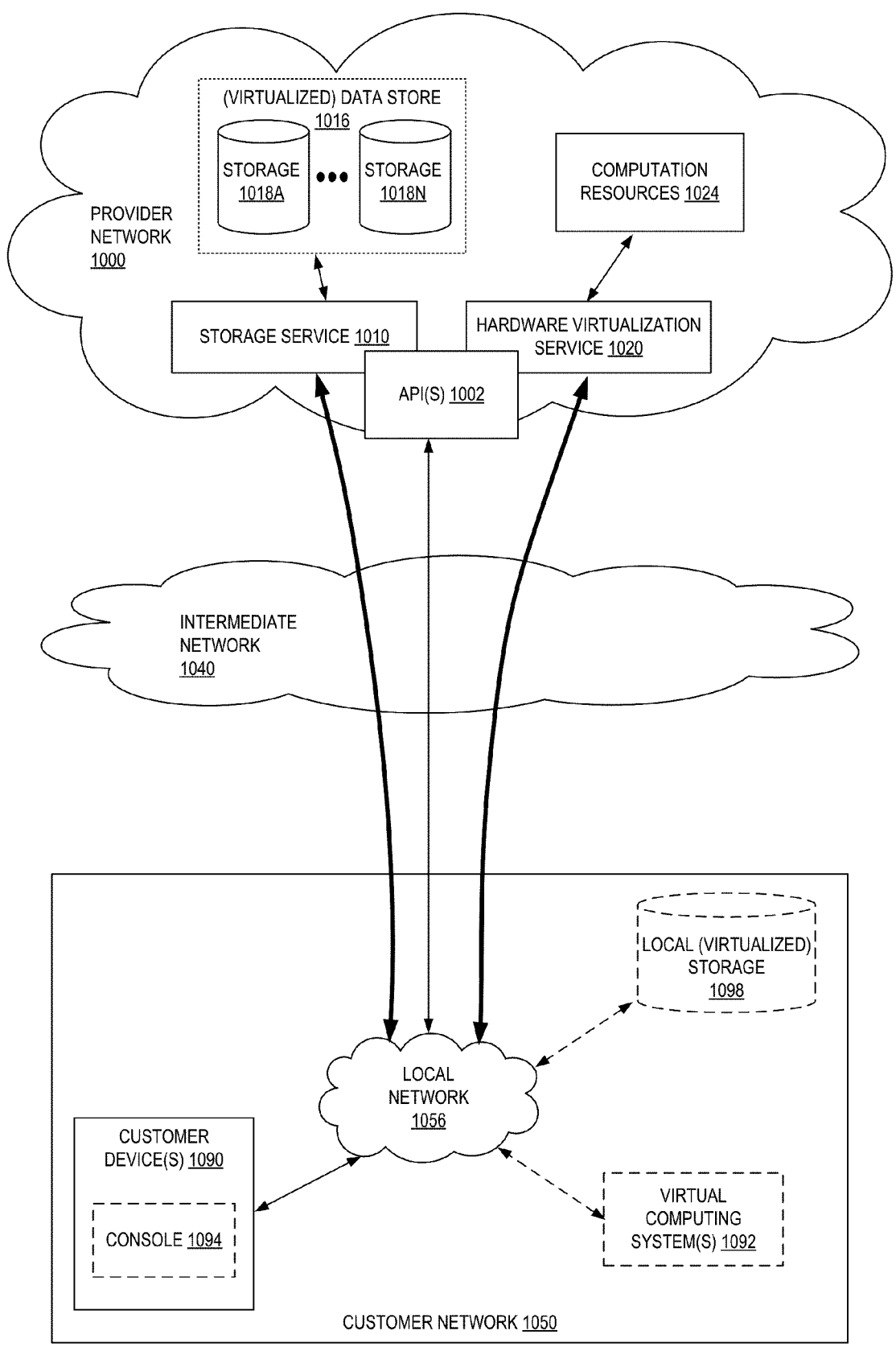
FIG. 10 is a block diagram of an example provider network that provides a storage service and a hardware virtualization service to users according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Figure 11:
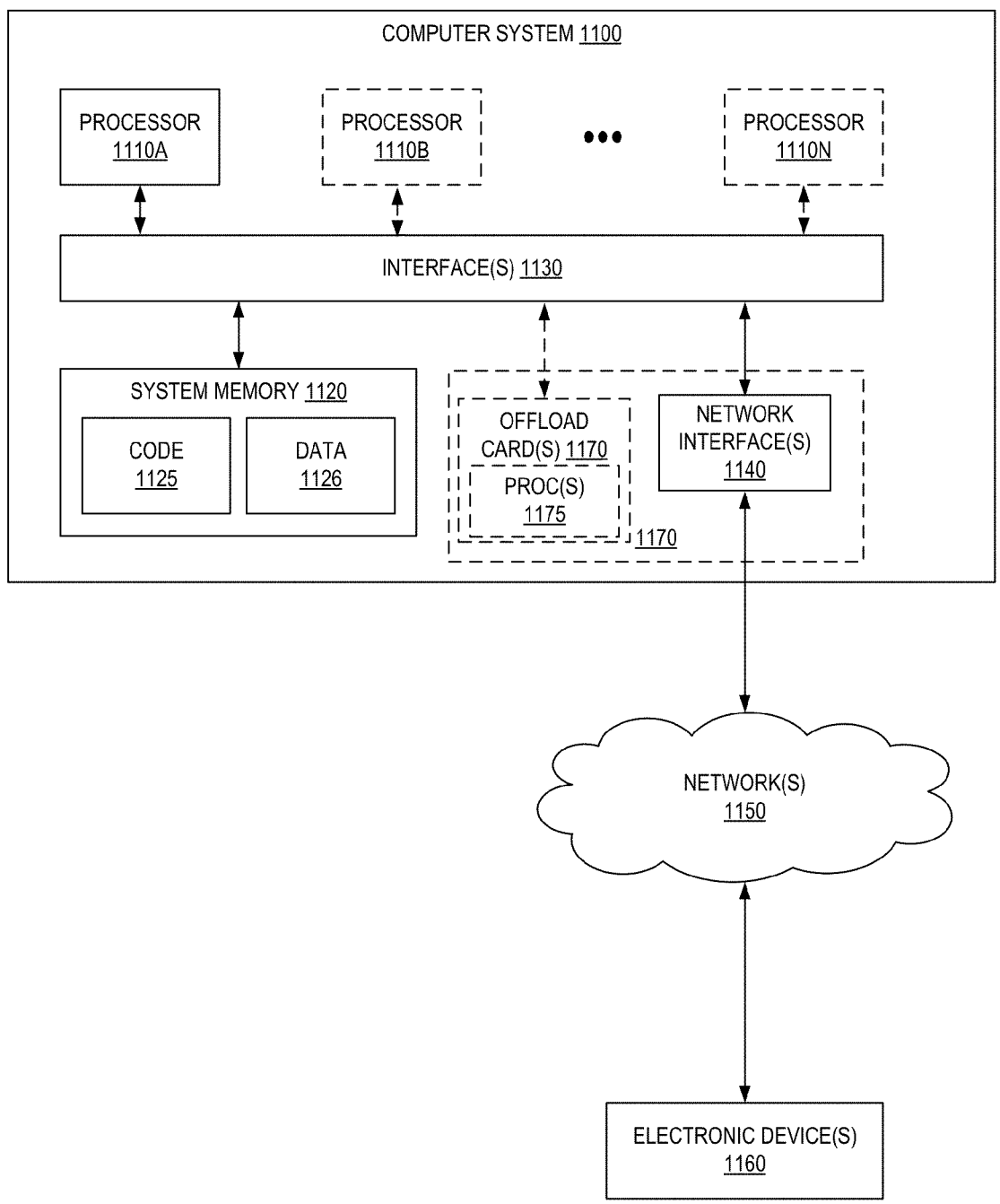
FIG. 11 is a block diagram illustrating an example computer system that may be used in some embodiments.

In some embodiments, a system that implements a portion or all of the techniques for providing an anomaly detection service for metric data collected by a data monitoring service as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect - Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by a data monitoring service, the method comprising:
receiving an application programming interface (API) request from a user account of a service provider network to receive alerts when the data monitoring service detects anomalies corresponding to at least one specified metric identified in the request, wherein the at least one specified metric corresponds to time series data collected by the data monitoring service;
responsive to receiving the API request, automatically:
creating a plurality of anomaly detection models for the at least one specified metric using historical time series data collected by the data monitoring service and corresponding to the at least one specified metric, wherein the anomaly detection models are created using a plurality of separate anomaly detection algorithms and a plurality of separate model settings;

causing display of a graphical user interface (GUI) including graphical representations of the anomaly detection models;

receiving input from the user account identifying one or more anomaly detection models, selected by the user account, of the plurality of anomaly detection models to use for anomaly detection;

obtaining additional time series data corresponding to the at least one specified metric;

using the one or more selected anomaly detection models to determine that at least a portion of the additional time series data represents an anomaly; and generating an alert notifying the user account of the anomaly.

2. The computer-implemented method of claim 1, further comprising:

receiving input via the GUI specifying a normal region surrounding one of the graphical representations; and modifying, based on the input specifying the normal region, settings associated with one of the anomaly detection models for identifying anomalies.

3. The computer-implemented method of claim 1, wherein the GUI includes an indication of how often an alarm is expected to be triggered for the specified metric based on model configuration settings of the anomaly detection models.

4. A computer-implemented method comprising:

receiving, by a data monitoring service of a service provider network, an application programming interface (API) request to enable anomaly detection for at least one specified metric identified in the request, wherein the specified metric is corresponding to time series data collected by the data monitoring service, and wherein the request is for a user account of the service provider network;

in response to receiving the request, automatically creating a plurality of anomaly detection models for the at least one specified metric using historical time series data collected by the data monitoring service and corresponding to the at least one specified metric, wherein the anomaly detection models are created using a plurality of separate anomaly detection algorithms and a plurality of separate model settings;

causing display of a graphical user interface (GUI) including graphical representations of the anomaly detection models;

receiving input from the user account identifying one or more anomaly detection models, selected by the user account, of the plurality of anomaly detection models to use for anomaly detection;

obtaining additional time series data corresponding to the at least one specified metric;

using the one or more selected anomaly detection models to determine that at least a portion of the additional time series data represents an anomaly; and generating an alert notifying a user account corresponding to the additional time series data of the anomaly.

5. The computer-implemented method of claim 4, further comprising:

receiving input via the GUI specifying a normal region surrounding one of the graphical representations; and modifying, based on the input specifying the normal region, settings associated with one of the anomaly detection models for identifying anomalies.

6. The computer-implemented method of claim 4, wherein the GUI includes an indication of how often an alarm is expected to be triggered for the specified metric based on model configuration settings of the anomaly detection models.

7. The computer-implemented method of claim 4, further comprising periodically updating the anomaly detection models based on the additional time series data.

8. The computer-implemented method of claim 4, further comprising:

creating a new anomaly detection model for the specified metric based on new model code or new model settings; and using the new anomaly detection model to determine that at least a portion of the additional time series data represents an anomaly.

9. The computer-implemented method of claim 4, further comprising:

receiving input indicating that the at least a portion of the additional time series data does not represent an anomaly; and updating the anomaly detection models based on the input indicating that the at least a portion of the additional time series data does not represent an anomaly.

10. The computer-implemented method of claim 4, further comprising:

receiving input identifying one or more data points of the historical time series data as anomalous data points; and creating the anomaly detection models based in part of the input identifying the one or more data points of the historical time series data as anomalous data points.

11. The computer-implemented method of claim 4, wherein the historical time series data and the additional time series data associated with the specified metric is generated by one or more computing resources of the service provider network.

12. The computer-implemented method of claim 4, wherein each anomaly detection model of the anomaly detection models is created based on a pairing of a model algorithm of a plurality of model algorithms and model settings of a plurality of model settings.

13. The computer-implemented method of claim 4, wherein generating the alert includes one or more of: causing display of a notification in the GUI, sending an email alert, and publishing a notification message to an event notification service.

14. A system comprising:

a first one or more electronic devices including one or more processors and memory, the first one or more electronic devices implementing a data monitoring service, the memory storing instructions that upon execution by the one or more processors cause the data monitoring service to:

obtain time series data associated with at least one specified metric from one or more components of a service provider network;

store the time series data in a data store; and a second one or more electronic devices including one or more processors and memory, the second one or more electronic devices implementing an anomaly detection service, the memory storing instructions that upon execution by the one or more processors cause the anomaly detection service to:

receive an application programming interface (API) request to enable anomaly detection for the at least one specified metric, wherein the at least one specified metric is identified in the request, and wherein the request is from a user account of a service provider network;

in response to receiving the request, automatically create a plurality of anomaly detection models for the at least one specified metric based on historical time series data collected by the data monitoring service and corresponding to the at least one specified metric, wherein the anomaly detection models are created using a plurality of separate anomaly detection algorithms and a plurality of separate model settings;
    cause display of a graphical user interface (GUI) including graphical representations of the anomaly detection models;
    receive input from the user account identifying one or more anomaly detection models, selected by the user account, of the plurality of anomaly detection models to use for anomaly detection;
    obtain additional time series data corresponding to the at least one specified metric;
    use the one or more selected anomaly detection models to determine that at least a portion of the additional time series data represents an anomaly; and
    generate an alert notifying a user account associated with the additional time series data of the anomaly.

15. The system of claim 14, wherein the instructions of the anomaly detection service upon execution by the one or more processors of the anomaly detection service further cause the anomaly detection service to:
    receive input via the GUI specifying a normal region surrounding one of the graphical representation; and
    modify, based on the input specifying the normal region, settings associated with one of the anomaly detection model for identifying anomalies.

16. The system of claim 14, wherein the GUI includes an indication of how often an alarm is expected to be triggered for the specified metric based on model configuration settings of the anomaly detection models.

17. The system of claim 14, wherein the anomaly detection models are stored in a data store in association with the user account.

18. The system of claim 14, wherein the instructions of the anomaly detection service comprise further instructions that upon execution by the one or more processors of the anomaly detection service further cause the anomaly detection service to periodically update the anomaly detection models based on the additional time series data.

19. The system of claim 14, wherein generating the alert includes one or more of: causing display of a notification in the GUI, sending an email alert, and publishing a notification message to an event notification service.

20. The system of claim 14, wherein the instructions of the anomaly detection service comprise further instructions that upon execution by the one or more processors of the anomaly detection service further cause the anomaly detection service to:
    create a new anomaly detection model for the specified metric based on new model code or new model settings; and
    use the new anomaly detection model to determine that at least a portion of the additional time series data represents an anomaly.

\* \* \* \* \*